US011743703B2

(12) United States Patent
Van Den Dungen

(10) Patent No.: US 11,743,703 B2
(45) Date of Patent: Aug. 29, 2023

(54) PERSONAL HELP BUTTON AND ADMINISTRATOR SYSTEM FOR A LOW BANDWIDTH PERSONAL EMERGENCY RESPONSE SYSTEM (PERS)

(71) Applicant: Lifeline Systems Company, Framingham, MA (US)

(72) Inventor: Wilhelmus Andreas Marinus Arnoldus Maria Van Den Dungen, Boxtel (NL)

(73) Assignee: Lifeline Systems Company, Framingham, MA (US)

( * ) Notice: Subject to any disclaimer, the term of this patent is extended or adjusted under 35 U.S.C. 154(b) by 437 days.

(21) Appl. No.: 17/101,750

(22) Filed: Nov. 23, 2020

(65) Prior Publication Data

US 2021/0168581 A1 Jun. 3, 2021

(30) Foreign Application Priority Data

Nov. 29, 2019 (EP) .................................... 19212635

(51) Int. Cl.
*H04W 4/00* (2018.01)
*H04W 4/90* (2018.01)
*G06N 3/08* (2023.01)
*G10L 15/06* (2013.01)
*G10L 15/16* (2006.01)
*G10L 15/22* (2006.01)

(52) U.S. Cl.
CPC ............... *H04W 4/90* (2018.02); *G06N 3/08* (2013.01); *G10L 15/063* (2013.01); *G10L 15/16* (2013.01); *G10L 15/22* (2013.01)

(58) Field of Classification Search
CPC ......... H04W 4/90; G06N 3/08; G10L 15/063; G10L 15/16; G10L 15/22
USPC ....................................................... 455/404.1
See application file for complete search history.

(56) References Cited

U.S. PATENT DOCUMENTS

| 8,620,256 | B2 | 12/2013 | Staehlin et al. |
| 8,680,991 | B2 * | 3/2014 | Tran ........................ G16Z 99/00 340/3.1 |
| 9,390,612 | B2 | 7/2016 | Barfield, Jr. et al. |
| 10,482,887 | B1 * | 11/2019 | Jha ........................ G10L 19/0018 |
| 2010/0286490 | A1 * | 11/2010 | Koverzin ............ G08B 21/0492 704/231 |
| 2013/0150686 | A1 * | 6/2013 | Fronterhouse ....... A61B 5/0022 600/595 |
| 2014/0206308 | A1 * | 7/2014 | Hatton ..................... H04W 4/90 455/404.1 |
| 2019/0073894 | A1 | 3/2019 | Mehta et al. |
| 2019/0122532 | A1 | 4/2019 | Pauws et al. |
| 2019/0209022 | A1 | 7/2019 | Sobol et al. |
| 2019/0213860 | A1 | 7/2019 | Shaprio et al. |

OTHER PUBLICATIONS

International Preliminary Report on Patentability, relating to Applicaiton No. PCT/EP2020/08312, dated Jun. 9, 2022.

* cited by examiner

*Primary Examiner* — Pakee Fang
(74) *Attorney, Agent, or Firm* — Honigman LLP

(57) ABSTRACT

A personal help button and the administrator part of a personal emergency response system are provided, in which verbal audio is converted into a low bandwidth format signal. A conversation algorithm is used which comprises a trained neural network. The low bandwidth format has a bandwidth below 500 bits/second.

12 Claims, 7 Drawing Sheets

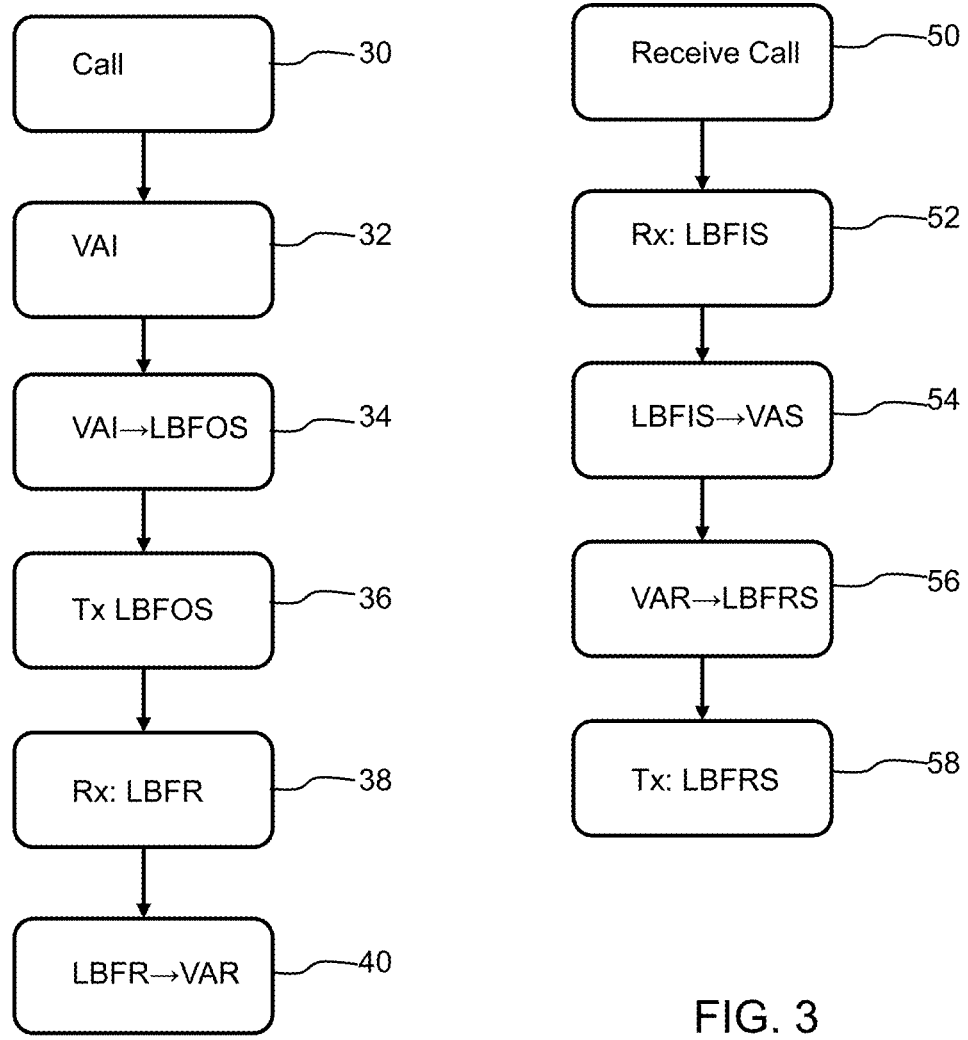

PERSONAL HELP BUTTON AND ADMINISTRATOR SYSTEM FOR A LOW BANDWIDTH PERSONAL EMERGENCY RESPONSE SYSTEM (PERS)

CROSS-REFERENCE TO PRIOR APPLICATIONS

This application claims the benefit of European Patent Application No. 19212635.7, filed on 29 Nov. 2019. This application is hereby incorporated by reference herein.

FIELD OF THE INVENTION

The invention relates to a Personal Emergency Response System (PERS).

BACKGROUND OF THE INVENTION

A Personal Emergency Response System (PERS) enables an elderly person, handicapped person, or other person at elevated risk of accident or incapacitating medical emergency to summon help.

A PERS can improve the quality of life for elderly living on their own while providing ease of mind to their loved ones. These systems typically make use of a body worn device such as wristband or neck-worn pendant. During an emergency, the subscriber presses an emergency push button (called a personal help button, PHB) on the device, which establishes a two-way call with the service provider's call center. The body worn device also typically comprises a fall detection device which incorporates a pressure sensor, for detecting height changes. Thus, an emergency call may also be initiated automatically in the event of a detected fall.

Such systems are typically on a subscriber basis, i.e. the at-risk person subscribes to the PERS service (either on a paid basis, or with the subscription provided by a healthcare provider, governmental agency, or other sponsor).

In a home-based system, by pressing the emergency button of the PHB, a speakerphone console in the residence is activated, by which the subscriber is placed into telephonic (or videophone, or the like) contact with a PERS agent usually via a cellular connection such as LTE. The agent speaks with the subscriber and takes appropriate action such as talking the subscriber through the problem, summoning emergency medical service (EMS), or alerting a neighbor or other authorized person to check on the subscriber. The location of the user is already known to the PERS agent.

There are also mobile systems which make use of the mobile cellular telephone network to enable communication between the subscriber and the PERS agent. The mobile system transmits location coordinates derived from GPS (or WiFi, triangulation, hotspots or similar) to enable the system to locate the user.

This invention relates in particular to the verbal communication between the user and the PERS agent.

A problem with mobile solutions is the need for a full cellular communications channel, with the associated equipment cost and rental cost. In particular, for an emergency system a 24/7 guaranteed channel is required.

It is also difficult to provide suitable communications quality in a small help button format, for example because of the need for a large antenna and/or the need for multiple antennas (e.g. in 4G). The large bandwidth of audio signals, which are needed to enable verbal communication between the user and the PERS agent, also adds cost and complexity, and prevents the use of lower bandwidth and lower cost communication alternatives as well as likely reducing the range of the signal compared to lower bandwidth signals.

SUMMARY OF THE INVENTION

The invention is defined by the claims.

According to examples in accordance with an aspect of the invention, there is provided a personal help button for a personal emergency response system, PERS, comprising:

a button for activating an emergency call;

an audio device for receiving a verbal audio input from a user and delivering verbal audio reply to the user;

a conversation algorithm for converting at least some of the verbal audio input into a low bandwidth format output signal and for converting a received low bandwidth format reply into a verbal audio reply, wherein the conversation algorithm comprises a trained neural network and the low bandwidth format has a bandwidth below 500 bits/second; and a transmission and reception system for the low bandwidth format, for transmitting the low bandwidth format output signal to a remote PERS helper and receiving the low bandwidth format reply from the remote PERS helper.

By "verbal" is meant an audio signal contains words, and hence it is part of a dialogue between people.

This help button makes use of a low bandwidth communication format, in particular so that the use of cellular telephony is avoided. To enable audio to be transmitted over the low available bandwidth, a trained neural network is used to convert the audio into a compressed format. The training of the neural network is based on historical dialogue between the user and the helper for existing systems (in which audio recordings are available). The neural network thus employs speech recognition to extract words and phrases. The provision of a large dataset of dialogue (e.g. for many years of operation of a full audio system) enables the trained neural network to achieve highly efficient data compression. In particular, the user messages have many common words, themes and phrases. Similarly, the replies from the PERS helper follow guidelines which indicate how to communicate in different situations. For example, the PERS helper may ask yes/no questions and/or use the five whys technique (to determine root cause of problem). Thus, the use of a neural network based on language and vocabulary enables a highly efficient and effective conversion of a emergency call into a low bandwidth format. For example, a reduced event vocabulary may result.

The personal emergency button may further comprise a speech synthesizer for generating the verbal audio reply.

The low bandwidth signal cannot typically be reconstructed as an audio signal. Thus, speech synthesis is used to enable the delivery of a verbal audio signal to the user.

The low bandwidth system for example has bandwidth below 250 bits/second.

The low bandwidth system may comprise narrowband IoT, Lora, Narrowband IoT, Wi-Fi HaLow, LTE Cat M1 or Sigfox technology systems. These provide an end-to-end solution avoiding the need for conventional cellular networks and provide improved range and coverage. Other current or future low bandwidth systems may of course be used.

Another aspect of the invention provides an administrator system for a personal emergency response system, PERS, comprising:

an input for receiving an emergency call from a user;

a transmission and reception system for receiving a low bandwidth format input signal from the PERS user and for transmitting a low bandwidth format reply signal to a PERS user;

a microphone for receiving a verbal audio reply from a PERS helper; and a conversation algorithm for converting the low bandwidth format input signal into a verbal or textual communication for the helper, and for converting a verbal audio reply from the helper to the low bandwidth format reply signal, wherein the conversation algorithm comprises a trained neural network and the low bandwidth format has a bandwidth below 500 bits/second.

The administrator system also converts between verbal audio data and the low bandwidth format. The final output to the helper does not necessarily need to be reconstructed speech; it may be text based, for example. However, the output provided by the helper is converted to audio for the user, so that at least at the user side, there is the impression of a natural conversation.

The administrator system may however further comprise a speech synthesizer for converting the verbal or textual communication into a verbal audio signal.

The invention also provides a personal emergency response system comprising:

a personal help button as defined above; and an administrator system as defined above.

Another aspect of the invention provides a communication method for a user of a personal help button of a personal emergency response system, PERS, to communicate with a helper of the PERS administrator, comprising:

activating an emergency call;

receiving verbal audio input from the user;

using a trained neural network conversation algorithm to convert the verbal audio input into a low bandwidth format output signal;

transmitting the low bandwidth output signal to the helper over a channel with a bandwidth below 500 bits/second;

receiving a low bandwidth format reply from the helper; and using the conversation algorithm to convert the low bandwidth format reply into a verbal audio reply.

This is the method by which the user communicates with the helper at the PERS administrator. The method is preferably implemented by computer program Another aspect of the invention provides a communication method for a helper of personal emergency response system, PERS, administrator to communicate with a user of the PERS:

receiving an emergency call;

receiving a low bandwidth format input signal from the user over a channel with a bandwidth below 500 bits/second;

using a trained neural network conversation algorithm to convert at least some of the low bandwidth format input signal into a verbal audio signal;

using the conversation algorithm to convert a verbal audio reply into a low bandwidth format reply signal; and transmitting the low bandwidth format reply signal to the user.

This is the method by which the PERS helper communicates with the PERS user. The method is preferably implemented by computer program It is noted that the term "reply" is used simply to distinguish between a signal in one direction and the other. It is not intended to imply that the nature of the verbal dialog needs to be question on one side and an answer from the other. It is just intended to signify two pieces of dialog, one after the other.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 2 shows the processing method performed by the personal help button;

FIG. 3 shows the processing method performed by the PERS administrator system;

DETAILED DESCRIPTION OF THE EMBODIMENTS

Figure 1:
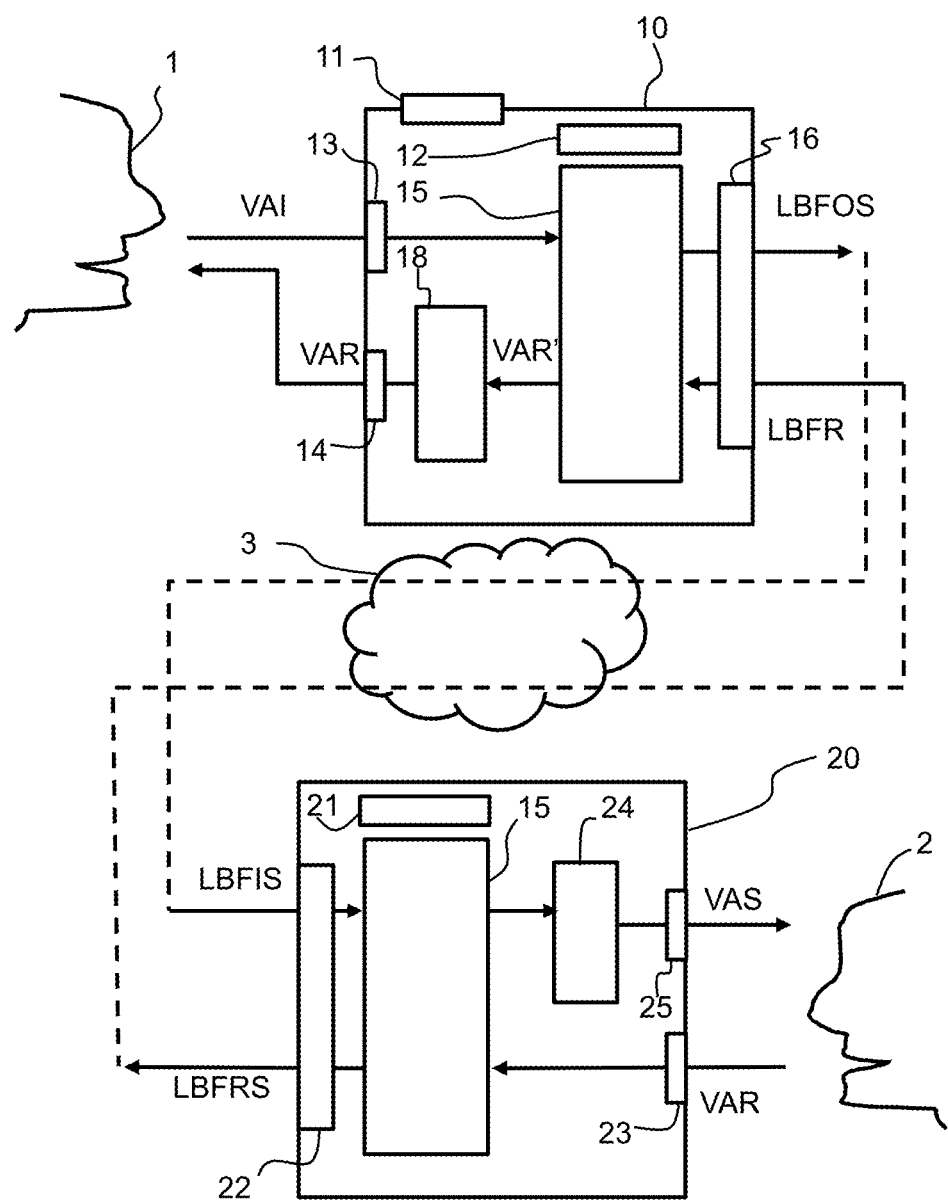
FIG. 1 shows the way speech is processed in accordance with the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a personal help button and the administrator part of a personal emergency response system, in which verbal audio is converted into a low bandwidth format signal. A conversation algorithm is used which comprises a trained neural network. The low bandwidth format has a bandwidth below 500 bits/second.

The invention is for application to a PERS, but relates specifically to the voice channel established between the user and the PERS agent. Thus, full details of the other parts of the system, such as the detection of the location of the user, the fall detection etc. will not be described. The aim of the invention is to avoid the need for a full cellular communications channel between the user and the PERS agent, once a call has been established (either automatically in the event of a detected fall, or triggered by the user actuating the PHB).

FIG. 1 shows the way speech is processed in accordance with the invention. FIG. 1 shows a user 1 and a PERS agent 2. They communicate over a low bandwidth channel 3, by which is meant a channel with a bandwidth of below 500 bits/second, for example below 250 bits/second or even below 100 bits/second.

The low bandwidth is for example insufficient for transmission and reception of high quality audio using known data compression techniques.

The user 1 has a personal help button 10 with a button 11 for activating an emergency call. The emergency call may also be activated based on detection by a fall detection unit 12.

An audio device is provided for receiving a verbal audio input, VAI, from a user and delivering verbal audio reply, VAR, to the user. The audio device is shown as a microphone 13 and a speaker 14.

A conversation algorithm 15 is provided for converting the verbal audio input into a low bandwidth format output signal, LBFOS, and for converting a received low bandwidth format reply, LBFR, into a verbal audio reply VAR'. The conversation algorithm comprises a trained neural network.

A transmission and reception system 16 is for processing signals in the low bandwidth format, for transmitting the low bandwidth format output signal, LBFOS to the remote PERS helper 20 and receiving a low bandwidth format reply, LBFR, from the remote PERS helper.

To enable audio to be transmitted reliably over the low available bandwidth, a trained neural network 15 is used to convert the audio into a compressed format. The training of the neural network is based on historical dialogue between users and helpers for existing systems (in which audio recordings are available). The neural network thus employs speech recognition to extract words and phrases or is supplied with audio data which has been subjected to conversion by speech recognition. The provision of a large dataset of dialogue (e.g. for many years of operation of previous versions of the system) enables the trained neural network to achieve highly efficient data compression. In particular, the user messages have many common words, themes and phrases. Similarly, the replies from the PERS helper follow guidelines which indicate how to communicate in different situations. Thus, the use of a neural network based on language and vocabulary enables a highly efficient conversion of audio into a low bandwidth format.

The low bandwidth format is not suitable for direct compression of the audio signal. Instead, the neural network extracts words, phrases and meanings, and may therefore discard other audio information, such as the particular sound of the speaker's voice. The personal emergency button may thus comprise a speech synthesizer 18 for generating the verbal audio reply, VAR which is output to the user, from the signal VAR' delivered by the trained neural network.

The administrator system 20 comprises an input 21 for receiving an emergency call from a user. This may be coded as a data message over the low bandwidth channel, rather than an audio message.

A transmission and reception system 22 is provided for receiving a low bandwidth format input signal, LBFIS, from the PERS user and for transmitting a low bandwidth format reply signal, LBFRS, to the PERS user 1.

A microphone 23 is provided for receiving a verbal audio reply, VAR, from a PERS helper.

The administrator system uses the same conversation algorithm. It converts the low bandwidth format input signal, LBFIS, into a verbal or textual communication, for the helper, and converts the verbal audio reply, VAR, from the helper to the low bandwidth format reply signal LBFRS.

The administrator system thus also converts between verbal audio data, VAR, and the low bandwidth format. The final output to the helper does not necessarily need to be reconstructed speech; it may be text based, for example.

FIG. 1 shows a speech synthesizer 24 for converting from the output of the trained neural network 15 to a verbal audio signal, VAS, for delivery to the PERS helper 2 via a speaker 25.

FIG. 2 shows the processing method performed by the personal help button.

The method comprises:
activating an emergency call in step 30;
receiving verbal audio input from the user in step 32; and
in step 34, using a trained neural network conversation algorithm to convert the verbal audio input into a low bandwidth format output signal.

In step 36, the low bandwidth output signal is transmitted to the helper over the low bandwidth channel.

In step 38, a low bandwidth format reply is received from the helper and in step 40 the conversation algorithm is used to convert the low bandwidth format reply into a verbal audio reply.

Thus, the personal help button allows two way communication with the PERS helper.

FIG. 3 shows the processing method performed by the PERS administrator system.

In step 50, an emergency call is received.

In step 52, a low bandwidth format input signal is received from the user over the low bandwidth channel.

The trained neural network conversation algorithm is used in step 54 to convert the low bandwidth format input signal into a verbal audio signal.

The conversation algorithm is then used in step 56 to convert a verbal audio reply into a low bandwidth format reply signal. The low bandwidth format reply signal is transmitted to the user in step 58.

Figure 4:
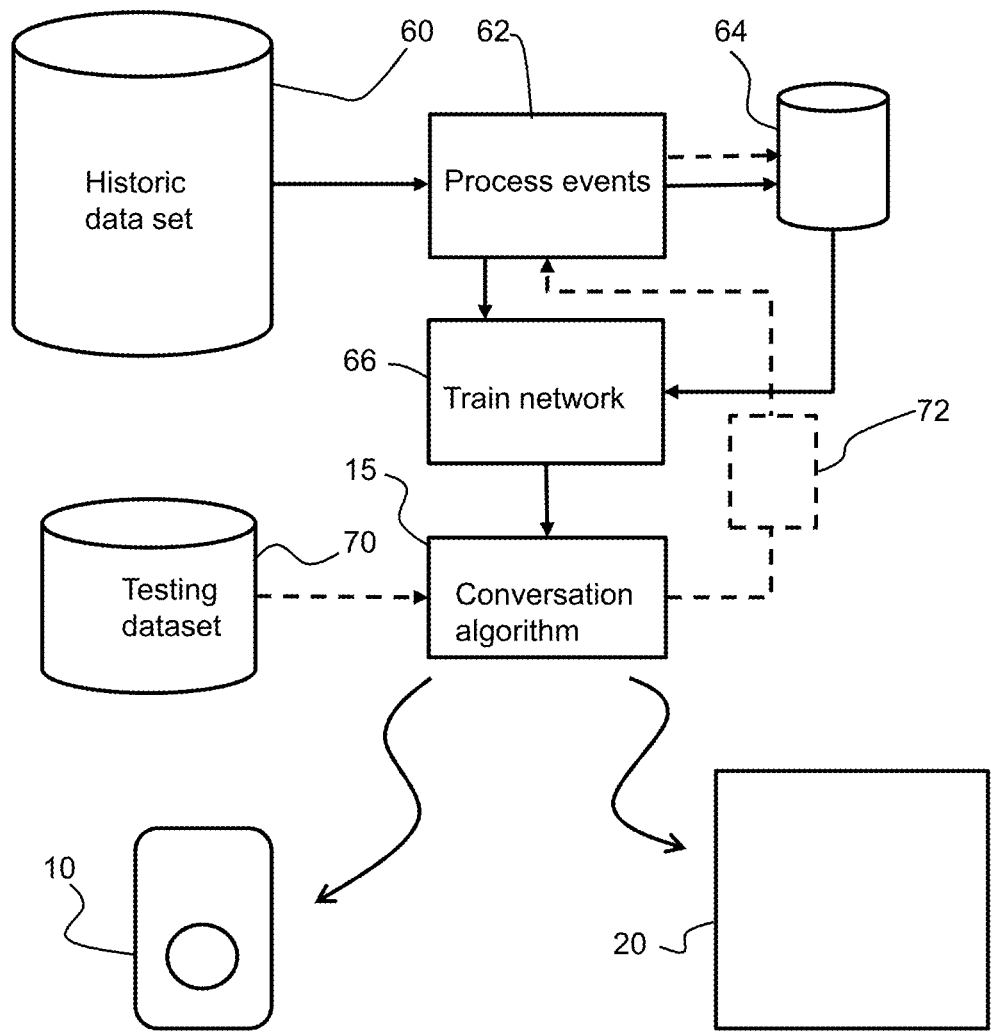
FIG. 4 shows how the neural network may be trained.

FIG. 4 shows how the neural network may be trained.

There is a historic dataset 60 which comprises recorded emergency calls "events") for previous system implementations. These can be processed with speech recognition software to extract words and meanings. These events are processed in step 62 to create an event vocabulary 64, which is a reduced data notation for representing the events, i.e. verbal communications.

Communication during PERS events for example uses a limited vocabulary, so the communication of any subscriber in any event can be mapped to this limited vocabulary by a trained neural network based on existing large audio recordings of PERS events.

The event information and event vocabulary is used to train the neural network as represented by block 66 to create the trained neural network 15, forming the conversation algorithm. A training set is thereby created to train the neural network to respond and communicate using and combining the limited vocabulary set.

This algorithm is provided as software to be stored in the PHB 10 and to be stored in the system administrator 20.

FIG. 4 also shows a testing dataset 70 used for testing the trained neural network. Feedback analysis is provided in step 72, which is used to further refine the training of the neural network as shown by the dotted arrows.

There are various options for low bandwidth format communication system.

Narrow bandwidth Internet of Things, NB-IoT, is a low power wide area network (LPWAN) technology. NB-IoT has been developed to enable efficient communication, long battery life for mass distributed devices and lower costs for wide geographical footprints or deep within urban infrastructure. The initial cost of the NB-IoT modules is expected to be comparable to GSM/GPRS/LTE. The underlying technology is however much simpler than current GSM/GPRS/LTE standards and its cost is expected to decrease rapidly as demand increases. Some of the possible low bandwidth communications standards are cellular (but not voice enabled) and others are not cellular.

Supported by all major mobile equipment, chipset and module manufacturers, NB-IoT can co-exist with 2G, 3G, and 4G mobile networks. It also benefits from all the security and privacy features of mobile networks, such as support for user identity confidentiality, entity authentication, confidentiality, data integrity, and mobile equipment identification.

LoRa (short for long range) is a spread spectrum modulation technique derived from chirp spread spectrum (CSS) technology. LoRa based devices have a module that communicates to a locally central location called a gateway. The network server communicates with the gateway via the internet.

SigFox is a global network operator of wireless networks to connect low-power objects such as electricity meters and smartwatches, which need to be continuously on and emitting small amounts of data. The Sigfox system employs differential binary phase-shift keying (DBPSK) and Gaussian frequency shift keying (GFSK). It is another example of a Low power wide area network (LPWAN).

The invention enables implementation within a PERS of reliable alarming, reliable position information and audio communication to assess emergency and help the subscriber.

The dramatically reduced communication channel bandwidth enables much simpler, lower power and cheaper Internet of Things communication technology and services The low bandwidth communication for long range communication may be combined with short range BlueTooth communication with a mobile phone.

The implementation of the trained neural network will be routine to those skilled in the art.

There are five key elements needed for a successful mobile PERS system: Reliable alarming, Reliable position information, Audio communication, Easy to wear 24/7 and Ease of use (preferable, wear and forget, with no recharging etc.). In this case, the audio communication is done through a low bandwidth communications channel. Since audio generally can not be transmitted through low bandwidth communication channels, a machine learning algorithm may be used to process audio into lower bandwidth data.

Generally, any suitable, machine learning algorithm may be used. A machine-learning algorithm is any self-training algorithm that processes input data in order to produce or predict output data. Here, the input data comprises audio data, which is then subjected to speech recognition and the output data comprises a low bandwidth format representation of the audio data. It may first convert the audio data into a format with a standardized vocabulary before then deriving the low bandwidth output.

A neural network can be trained to codify certain large inputs into smaller outputs. A neural network could be trained to codify a set of pre-determined words and output a 16 bit "code" for each word. There are 65536 possible combinations of a 16 bit code, therefore the neural network could learn up to 65536 words and output a different 16 bit value for each of them. The set of words can be pre-determined by selecting words which are often used during the certain situations. For example in an emergency call certain words such as "help", "broken" and "fall" are commonly used. The neural network can then be trained to codify each word (e.g. "help"=0000 0000 0000 0011, "fall"=0000 0000 0000 1100). As it may not be feasible for the neural network to learn all of the existing words, it is also possible to train the neural network to output a null character (0000000000000000) when a word which has not learnt is input into the neural network.

The input for the neural network could be an uncompressed audio format (such as .WAV), lossless compression formats (such as .WV) and lossy compression formats (such as .MP3). Typical audio files of around 1 minute are typically 1-10 MB large, depending on whether they are compressed and the compression rate. For the lower range (typically .MP3), this amounts to around 80 Mbits/minute or 1.3 Mbits/second.

Words can for example take between half a second and 2 seconds to be said, depending on the length of the word and the speed at which it is spoken. Therefore, at best, each word spoken during an emergency call, when in digital audio format, can be up to 2.6 Mbits in size. The neural network can be trained with files this large for each of the pre-determined words to recognize the words and output, for example, a 16 bit code. Therefore a 2.6 Mbit file containing the word "broken" can be turned into a 16 bit file, and the speech information can be transferred at as low as 8 bits/second.

The neural network can also be trained to receive the 16 bit code and "de-codify" it. In this case, the neural network turns the 16 bit file into, for example, a 2.6 Mbit .MP3 file containing the word "broken". The neural network can also be trained to identify whether it is receiving an audio file or whether it is receiving a file containing a code and therefore output either a 16 bit code or an audio file. This is simple as the audio files are usually much larger than the code files. Alternatively, the signal can be processed beforehand and the neural network informed of whether it has to codify an audio signal or whether it has to de-codify a 16 bit code.

For example, a user could use the personal help button 10 when they have fallen. The user could believe they have broken their hip and on pressing the button, saying: "Help, I think I have broken my hip". All of these words are typical of emergency calls, so it can be assumed that the neural network has learnt all of the words above. Since all of the words are short, they may take around half a second each to say, so the whole sentence may be stored in an .MP3 file of about 4.3 Mbits. The neural network then recognizes all of the words and codifies them all into eight 16 bit "codes".

The sentence may be codified by the neural network as follows as follows, where the inputs are audio data on the left side and the outputs 16 bit "codes" on the right side:

"Help"=0000 0000 0000 0011;
"I"=0000 0000 0000 0001;
"think"=0110 0110 1001 0001;
"I"=0000 0000 0000 0001;
"have"=0010 0100 0001 1001;
"broken"=0000 0000 0000 1111;
"my"=1110 0100 1001 1001;
"hip"=0000 0010 0000 0000;

The words could be grouped as is shown above. For example words for body parts could only have the last 8 bits as always 0; the word "hip" above only has one bit value of 1 on the seventh bit and all of the last 8 bits have bit value 0.

The example above would only need a transfer speed of 32 bits/second instead of 1.3 Mbits/second typically needed for compressed audio file transfers. Thereafter an operator may receive the codified sentence, and using the same neural network, the sentence is de-codified. In this way, the operator can communicate with the user in need of help without the need of a high bandwidth transmission line. The operator may be an automated call center, which identifies the severity of the situation and decides whether to call a human operator, emergency services, police or any other services. Alternatively, the operator could be a human operator.

There is also the case when the words spoken by the user may not have been learnt by the neural network. For example, a user could use the personal help button 10 and say: "Help, I have my foot stuck on the fence". In this case, the word "fence" may not be a typical word in emergency calls and therefore not have been learnt by the neural network. The neural network could output a null character as it does not recognize the word. In this case, the audio data for the specific word could be transferred at a slow transfer rate in order to help a human operator understand the context of the emergency. The unknown word may also be learnt by the neural network such that the next time it will recognize it.

In general, an operator following protocol would ask multiple questions to get a high confidence level of whether there is need for help or not by asking yes/no questions or other suitable interrogation techniques (e.g. five whys technique). Therefore, it is unlikely that unknown words would be used, and if they are used, they may not be necessary to be confident that help is needed.

Indeed, the overall purpose of the dialog is to ascertain whether or not emergency assistance is required with a high degree of confidence.

Alternatively, the word could be omitted from the sentence, for example, for an automated operator. It may also be possible for the neural network to be trained to recognize certain common syllables, such that when it does not recognize a word, it tries to recognize a syllable from the word to help a human operator understand the context of the emergency.

Using the PERS responders procedures, follow-up questions are asked to determine if help is needed. The fence, in the example above, is of secondary importance and could be address in a later phase of the emergency response (e.g. neighbors, ambulance etc.). In the PERS case the most important question to be answered is: Is help needed?/Is it a real emergency?

It may also be possible to use a speech recognition module which can recognize the speech from the user and convert the speech into a machine-readable format, such as ASCII code (standard computer generated text). The text data could then be input into the neural network instead or as well as the audio data to aid the neural network in identifying each word. The neural network may then be either configured to output audio data or text data which is the input into a text to speech module.

Due to the variability in speech from different users and at different situations, it may be difficult for a neural network to learn each word in any situation by any user. Conventional speech to text software is known to struggle to identify certain accents and even certain words it has previously recognized when a user speak faster or slower than usual. It is therefore important to train the neural network with many examples of each word. It may also be possible to train the neural network to recognize certain phrases and sentences, such as typical questions asked by PERS responders A protocol may be in place which is designed to ask specific questions to determine if help is needed. The first response from the user could have parts that are not understood by the neural network or the system, and therefore have a very low confidence level. After asking, for example, five more questions (e.g. five whys technique) the confidence level of answering the question "Help needed" is likely to rise above a minimum threshold.

Figure 5:
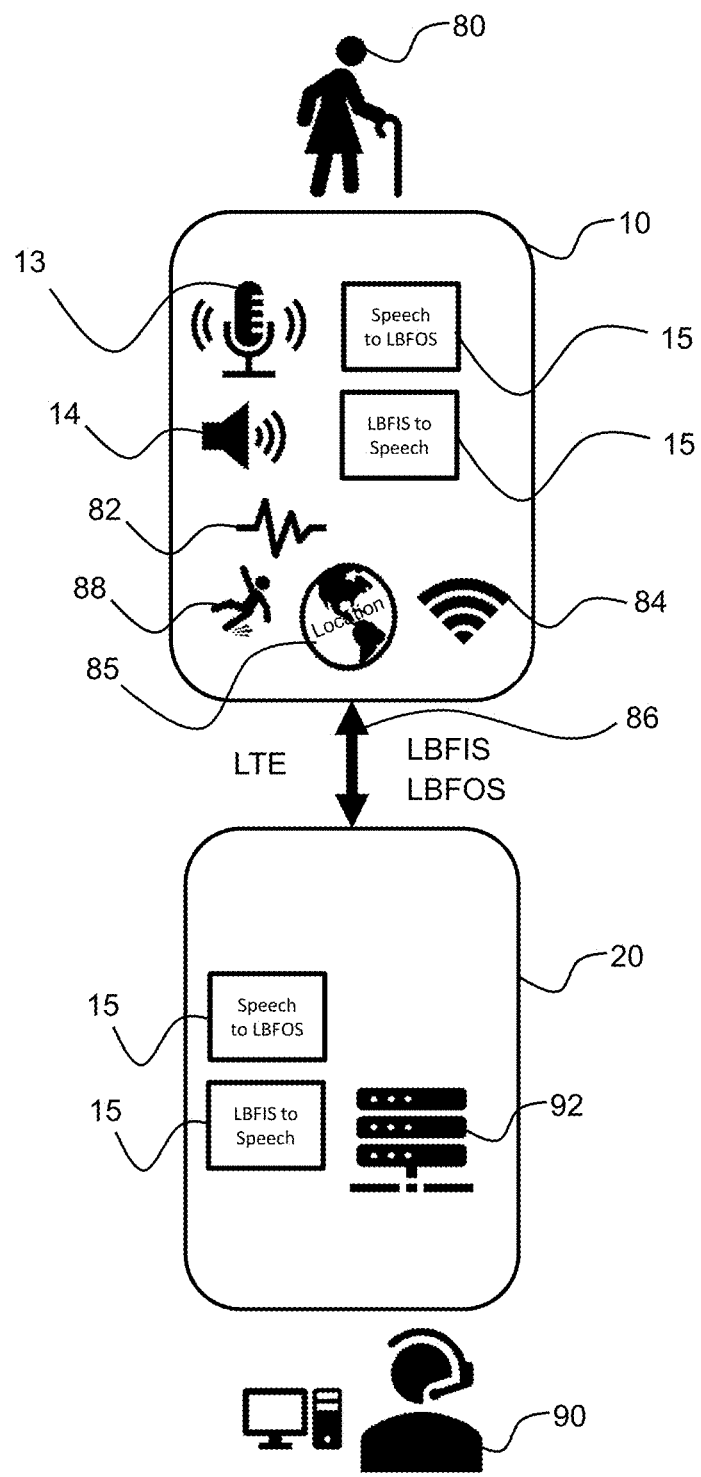
FIG. 5 shows an example of a mobile PERS system.

FIG. 5 shows an example of a mobile PERS system. In one example, if a user 80 is in need of help and activates the personal help button 10, the user 80 will be put in contact with an operator. The personal help button may also trigger a call automatically based on monitored physiological parameters (e.g. heart beat) represented by symbol 82. The user may be at first connected by an LTE high bandwidth connection (such as 4G), by WiFi 84 or any wireless high bandwidth connection. The button may also find the location 85 of the user 80. If there in no coverage for the LTE connection or WiFi 84, the button 10 then communicates with the operator through a low bandwidth channel 86. In this case, a neural network 15 may be used to turn speech into a low bandwidth format output signal (LBFOS). The LBFOS is then transmitted to the operator 90. The operator 90 usually follows a protocol 92 of questions to ask in order to increase the confidence level (e.g. five whys technique). The operator 90 may be a human call center operator or an automated operator bot. In the case of an automated bot, a human call center operator may be included in the call in some cases, for example, when the automated operator bot has a low confidence level or when "help needed" is determined. In any case, if it can not be determined whether the user 80 needs help, the operator 90 may send help as a fail safe measure (e.g. the user 10 can not communicate normally due to an accident, represented by symbol 88).

In another example, the personal help button 10 may include an automated operator bot, such that the user can communicate with the bot without the need of the low bandwidth channel 86. Once "help needed" is determined, the personal help button 10 then begins communication through the low bandwidth channel 86 to alert a human call center operator 90 or an emergency service.

Figure 6:
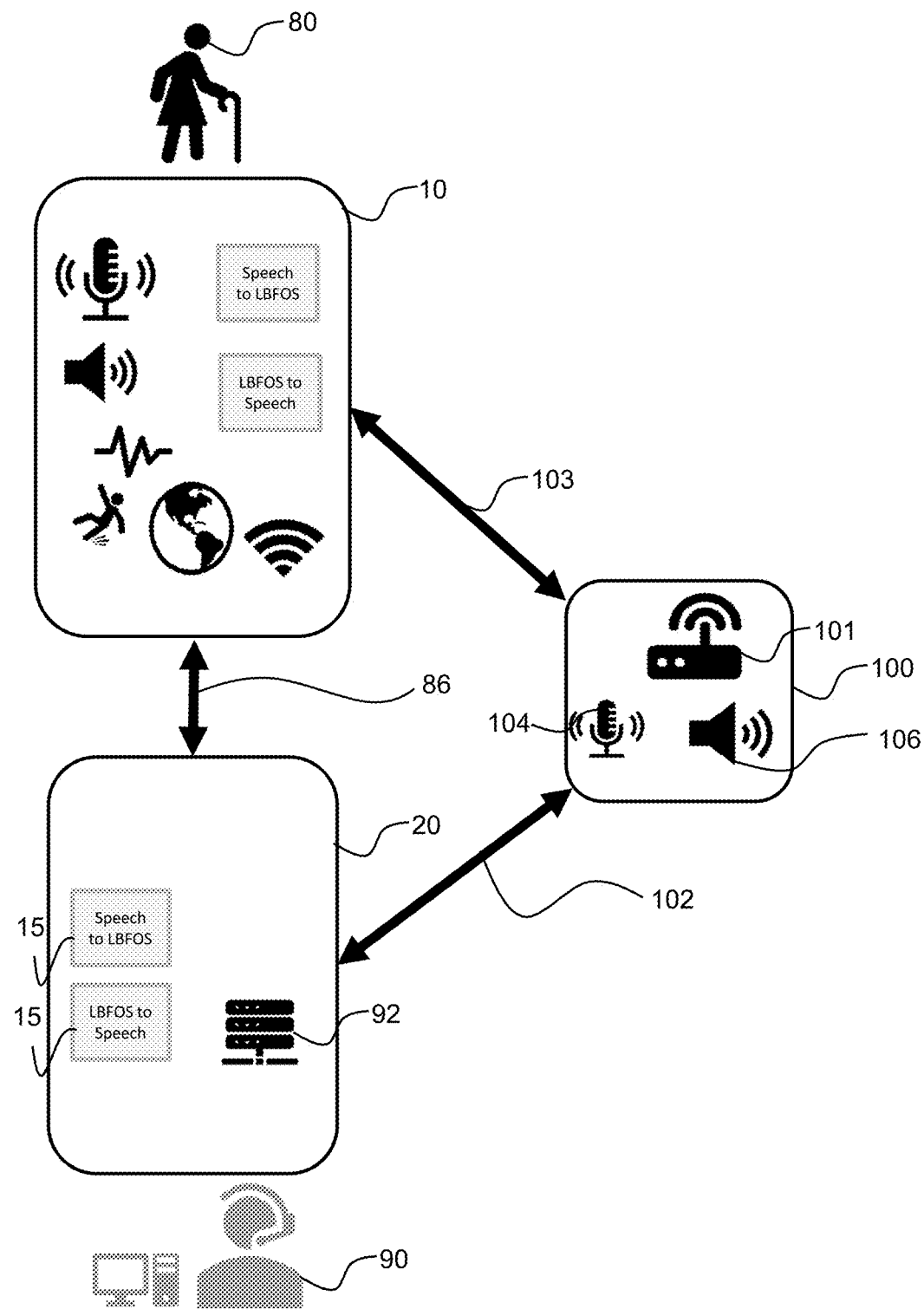
FIG. 6 shows an example of a mobile PERS system with a gateway communicator.

FIG. 6 shows an example of a mobile PERS system with a gateway communicator 100. The gateway communicator 100 may have a high bandwidth connector 101 (e.g. WiFi router) and be connected to the operator 90 by a high bandwidth connection 102 (e.g. 4G or land line). The personal help button 10 will alert the operator 90 that help may be needed when activated, wherein the button 10 and the gateway communicator 100 are connected via a connection 103 (e.g. BlueTooth, WiFi etc.). The user 80 may then communicate with the operator 90 through the gateway operator 100. The personal help button 10 acts as a fail safe measure to ensure that if the gateway communicator 100 can no longer communicate with the operator 90, the user 80 can still communicate with the operator 90 through a low bandwidth channel 86 with the personal help button 10. The gateway communicator 100 may be a home device with a microphone 104 and speaker 106 (e.g. a laptop) or a mobile phone. The personal help button 10 may include a gateway communicator 100 within the button 10 such that it is able to connect to an internet connection (e.g. Wi-Fi), and wherein the low bandwidth channel 86 acts as a fail safe in the case the internet connection is interrupted.

Figure 7:
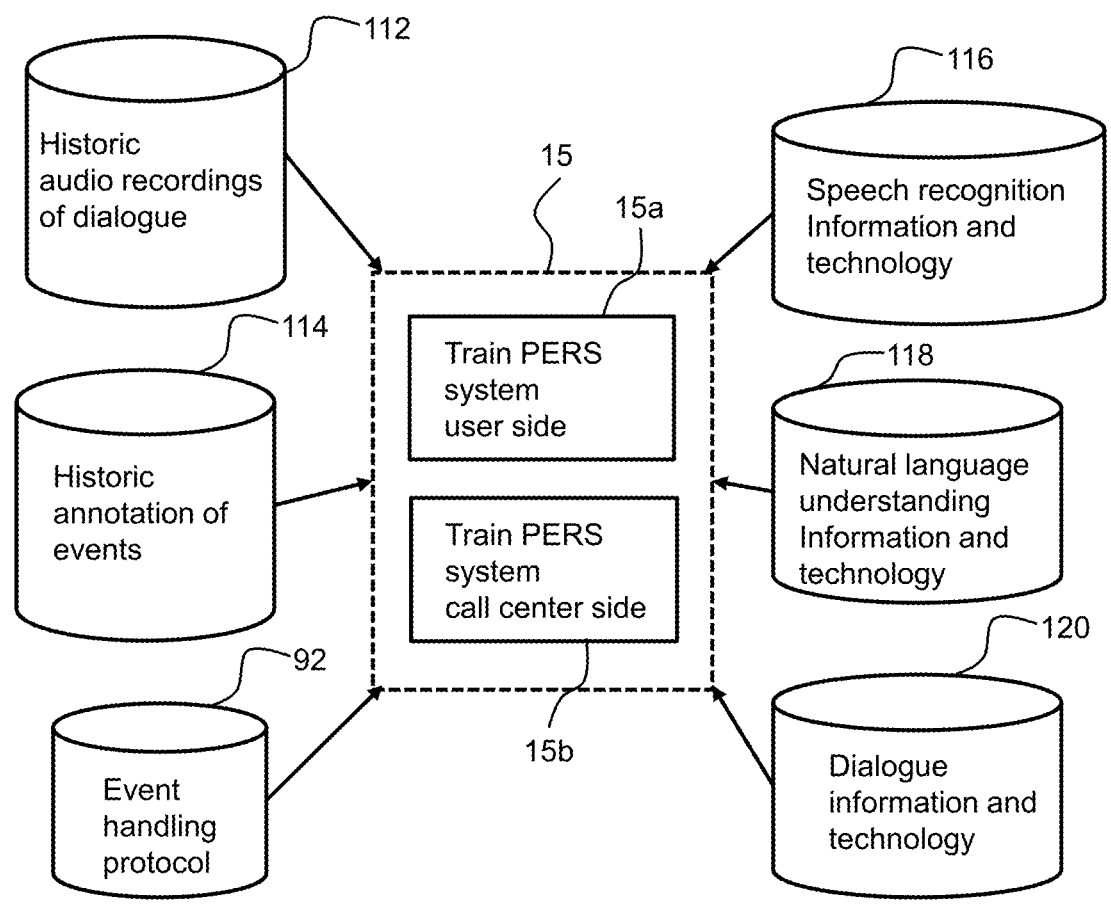
FIG. 7 shows an example of how a neural network in a PERS system may be trained.

FIG. 7 shows an example of how a neural network in a PERS system may be trained. In one example, a neural network 15 is trained with historic audio recordings of dialogue 112 from, for example, historic calls to a help line. The historic calls may be annotated 114 with the meaning of the speech to help the neural network recognize certain words and/or phrases and may further be trained with the event handling protocol 92. The neural network may also partly comprise speech recognition technology 116, dialogue technology 120 and/or natural language understanding technology 118, and may be trained with speech recognition information, dialogue information and/or natural language understanding information. Both the neural network on the user side 15a and the neural network on the call center side 15b may be trained with the mentioned data/information/technology. The neural network 15 may be further trained using validation testing.

Figure 8:
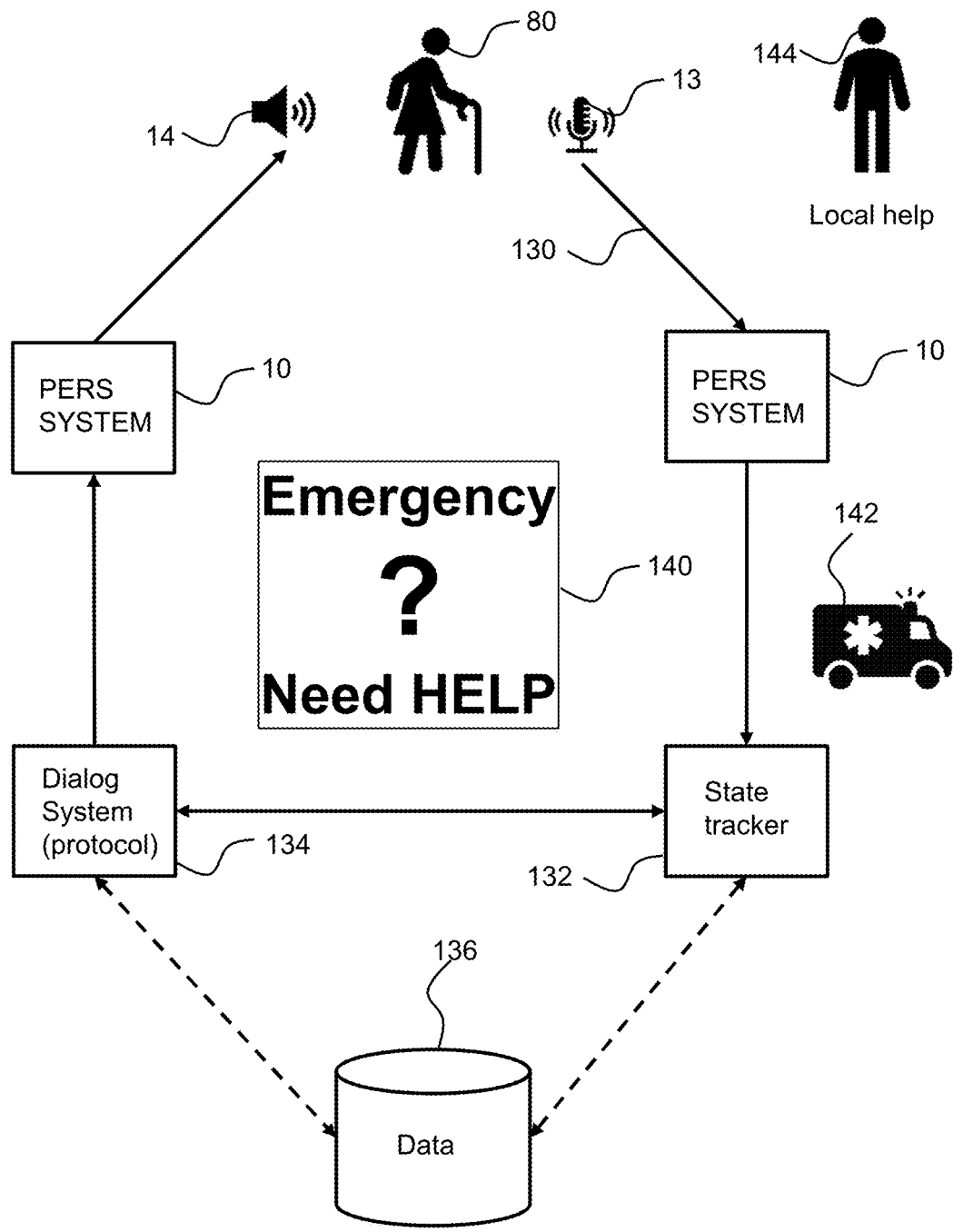
FIG. 8 shows an example of how a PERS system may be used by a user.

FIG. 8 shows an example of how a PERS system may be used by a user. A user 80 may first activate an emergency call 130 through the personal help button 10 (PERS system). The call 130 may go to a call center where the state of the user 80 is tracked by a state tracker 132. A dialogue system 134 (dialogue protocol) is operated by the operator 90. The dialog system includes a protocol 92 which may include interrogation techniques, such as the five whys technique, to ensure a high confidence level on the state of the user 80. Historic data 136 may be used to help the operator 90 determine whether help is needed (e.g. an emergency) 140. The speech from the user 80 and/or the operator may be processed by a neural network 15 and communicated through a low bandwidth channel 86 if needed (e.g. no LTE coverage). If the operator 90 determines if there is an emergency 140 and/or that help is needed, the operator 90 may call emergency services 142 (private and/or public) and/or they may contact local help 144 (e.g. neighbors).

Suitable machine-learning algorithms for being employed in the present invention will be apparent to the skilled person. Examples of suitable machine-learning algorithms include decision tree algorithms and artificial neural networks. Other machine-learning algorithms such as logistic regression, support vector machines or Naïve Bayesian model are suitable alternatives. Another alternative is using natural language processing (NLP) related algorithms.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

In the main examples above, all of the spoken dialogue by the user of the system is converted into the low bandwidth format for transmission to the administrator system. However, as mentioned above, some of the dialogue may take place in the personal help button itself.

In some examples above, the low bandwidth channel is used only when a high bandwidth channel is not available. However, a low cost system will have no compatibility with conventional high bandwidth cellular audio channels. Thus, the low bandwidth channel is used at all times.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A personal help button for a personal emergency response system, PERS, comprising:
   a button for activating an emergency call;
   an audio device for receiving a verbal audio input (VAI) from a user and delivering a verbal audio reply (VAR) to the user;
   a conversation algorithm for converting at least some of the verbal audio input (VAI) into a low bandwidth format output signal (LBFOS) and for converting a received low bandwidth format reply (LBFR) into a verbal audio reply (VAR), wherein the conversation algorithm comprises a trained neural network and the low bandwidth format has a bandwidth below 500 bits/second; and
   a transmission and reception system for the low bandwidth format, for transmitting a low bandwidth format output signal to a remote PERS helper and receiving the low bandwidth format reply from the remote PERS helper.

2. A personal help button as claimed in claim 1, further comprising:
   a speech synthesizer for generating the verbal audio reply.

3. A personal help button as claimed in claim 1, wherein the low bandwidth system has bandwidth below 250 bits/second.

4. A personal help button as claimed in claim 1, wherein the low bandwidth system comprises narrowband IoT, Lora, Narrowband IoT, Wi-Fi HaLow, LTE Cat M1 or Sigfox technology systems.

5. A personal help button as claimed in claim 1, wherein the trained neural network is trained using verbal audio data from previous emergency events.

6. An administrator system for a personal emergency response system, PERS, comprising:
- an input for receiving an emergency call from a user;
- a transmission and reception system for receiving a low bandwidth format input signal (LBFIS) from the PERS user and for transmitting a low bandwidth format reply signal (LBFRS) to a PERS user;
- a microphone for receiving a verbal audio reply (VAR) from a PERS helper; and
- a conversation algorithm for converting the low bandwidth format input signal (LBFIS) into a verbal or textual communication for the helper, and for converting a verbal audio reply (VAR) from the helper to the low bandwidth format reply signal (LBFRS), wherein the conversation algorithm comprises a trained neural network and the low bandwidth format has a bandwidth below 500 bits/second.

7. An administrator system as claimed in claim 6, further comprising a speech synthesizer for converting the verbal or textual communication into a verbal audio signal (VAS).

8. An administrator system as claimed in claim 6, wherein the low bandwidth system has bandwidth below 250 bits/second.

9. An administrator system as claimed in claim 6, wherein the low bandwidth system comprises narrowband IoT, Lora, Narrowband IoT, Wi-Fi HaLow, LTE Cat M1 or Sigfox technology systems.

10. An administrator system as claimed in claim 6, wherein the trained neural network is trained using verbal audio data from previous emergency events.

11. A non-transitory computer-readable medium implementing a computer program comprising computer program code means which is adapted, when said program is run on a computer, to implement a communication method for a user of a personal help button of a personal emergency response system, PERS, to communicate with a helper of the PERS administrator, the method comprising:
- activating an emergency call;
- receiving verbal audio input from the user;
- using a trained neural network conversation algorithm to convert at least some of the verbal audio input into a low bandwidth format output signal;
- transmitting the low bandwidth output signal to the helper over a channel with a bandwidth below 500 bits/second;
- receiving a low bandwidth format reply from the helper; and
- using the conversation algorithm to convert the low bandwidth format reply into a verbal audio reply.

12. A communication method for a helper of personal emergency response system, PERS, administrator to communicate with a user of the PERS:
- receiving an emergency call;
- receiving a low bandwidth format input signal from the user over a channel with a bandwidth below 500 bits/second;
- using a trained neural network conversation algorithm to convert the low bandwidth format input signal into a verbal audio signal;
- using the conversation algorithm to convert a verbal audio reply into a low bandwidth format reply signal; and
- transmitting the low bandwidth format reply signal to the user.

* * * * *